United States Patent [19]
Wada

[11] Patent Number: 5,639,041
[45] Date of Patent: Jun. 17, 1997

[54] CARTRIDGE CARRIER MECHANISM FOR A MAGNETIC TAPE CARTRIDGE APPARATUS

[75] Inventor: Satoshi Wada, Yamagata, Japan

[73] Assignee: NEC Corporation, Tokyo, Japan

[21] Appl. No.: 570,378

[22] Filed: Dec. 11, 1995

Related U.S. Application Data

[63] Continuation of Ser. No. 129,366, Sep. 30, 1993, abandoned.

[30] Foreign Application Priority Data

Sep. 30, 1992 [JP] Japan .................. 4-260979

[51] Int. Cl.$^6$ .............. G03B 21/04; G11B 23/04; B66C 1/00; B66C 3/00
[52] U.S. Cl. .............. 242/337; 242/559; 294/116; 414/739
[58] Field of Search .............. 242/337, 337.1, 242/533, 533.1, 559.3, 560, 560.1, 559; 294/116; 414/739

[56] References Cited

U.S. PATENT DOCUMENTS 3,920,195 11/1975 Sills et al. .................. 242/337
4,651,879 3/1987 Harris et al. .................. 294/116 X

FOREIGN PATENT DOCUMENTS 235243 10/1991 Japan .

*Primary Examiner*—John Q. Nguyen
*Attorney, Agent, or Firm*—Sughrue, Mion, Zinn, Macpeak & Seas

[57] ABSTRACT

A magnetic tape cartridge carrier mechanism for transporting a selected one of a number of cartridges to a predetermined position so that writing or reading data from the cartridge may be accomplished. In response to a signal received from data processing equipment or a similar host, the mechanism uses rollers (9) and (14B), motors (13) and (17) and rails (6) and (7) to position itself in front of a particular cell block containing a specific cartridge. From this position, the mechanism selects a cartridge from either of two sides of the apparatus without the necessity of rotating. This is accomplished by inserting a pair of fingers (11A) and (11B) into the cell (3) on the selected side and then moving the fingers together to grasp the selected cartridge. The fingers are then retracted and the mechanism relocated to the predetermined position so data can be read from and/or written to the cartridge.

4 Claims, 5 Drawing Sheets

5,639,041

CARTRIDGE CARRIER MECHANISM FOR A MAGNETIC TAPE CARTRIDGE APPARATUS

This is a continuation of application Ser. No. 08/129,366 filed Sep. 30, 1993, abandoned.

BACKGROUND OF THE INVENTION

The present invention relates to a magnetic tape cartridge apparatus for use with data processing equipment or similar host and, more particularly, to a cartridge carrier mechanism incorporated in an aggregate type magnetic tape cartridge apparatus for transporting desired one of a number of magnetic tape cartridges to a predetermined position for writing or reading data in or out of the cartridge.

A magnetic tape cartridge apparatus for the above application is disclosed in Japanese Patent Laid-Open Publication (Kokai) No. 235243/1991 by way of example. The apparatus taught in this Kokai includes a cartridge carrier mechanism having a finger cam holder affixed to a push rod and holding rotatable finger cam rollers. The push rod is slidably guided by a finger support. Two fingers are rotatably supported by the finger support at one end thereof and constantly biased toward each other by a finger spring at the intermediate portions thereof. The finger support is driven by a motor. A lock solenoid is mounted on the finger support and prevents the two fingers from closing when a magnetic tape cartridge is to be inserted. A finger frame maintains the two fingers in an open position by pushing out the push rod when the finger support is held in the initial position thereof.

The conventional cartridge carrier mechanism described above has some problems left unsolved, as follows. To begin with, the mechanism for opening and closing the two fingers is located in a region which a magnetic tape cartridge passes when pulled out by the cartridge carrier mechanism. Hence, when a number of magnetic tape cartridges are arranged face-to-face at opposite sides of the tape cartridge apparatus, the cartridge carrier mechanism cannot pull out or insert such cartridges unless it is bodily turned over by an extra mechanism.

Further, the two fingers for nipping the tape cartridge are opened and closed in association with forward/rearward movement caused by a motor. Therefore, when a condition apt to cause the cartridge being transported by the cartridge carrier mechanism to jump out of the fingers occurs, an action for nipping the cartridge by the two fingers has to be performed. The mechanism, therefore, cannot recover from such a condition unless it is moved to the initial position thereof, i.e., a position where the push rod contacts the finger frame.

SUMMARY OF THE INVENTION

A cartridge carrier mechanism of the present invention has a finger base, and a plurality of fingers for holding a magnetic tape cartridge. The fingers are movable toward and away from each other on the finger base in a direction perpendicular to an intended direction of insertion of the cartridge. A hand base supports the finger base while allowing the finger base to move in a reciprocating motion in the intended direction of insertion of the cartridge. A finger motor is mounted on the finger base for causing the fingers to move toward and away from each other.

BRIEF DESCRIPTION OF THE DRAWINGS

The features and advantages of the present invention will become apparent from the following description when taken in conjunction with the accompanying drawings in which.

DESCRIPTION OF THE PREFERRED EMBODIMENT

Figure 1:
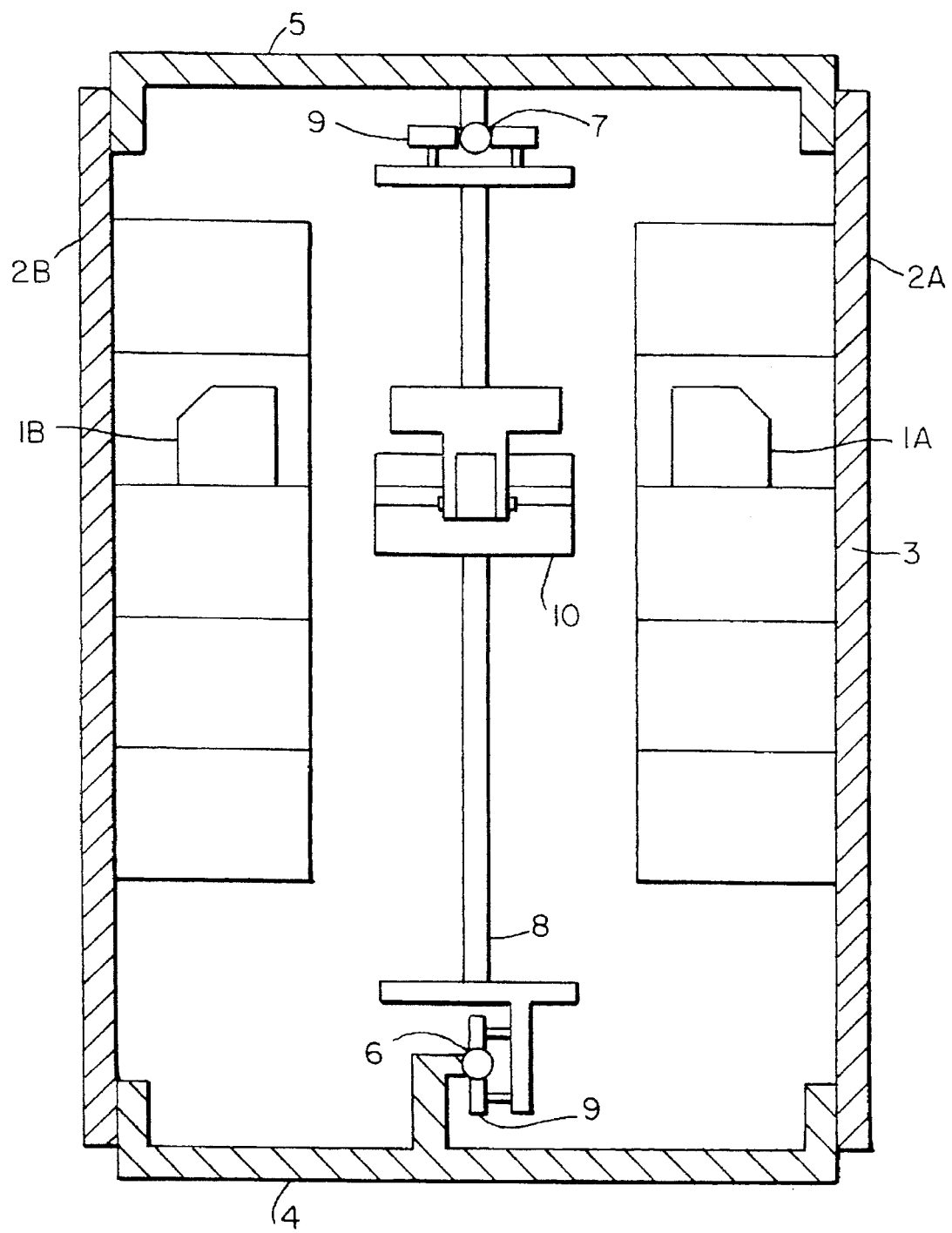
FIG. 1 is a sectional side elevation of a magnetic tape cartridge apparatus implemented with a cartridge carrier mechanism embodying the present invention.
Figure 2:
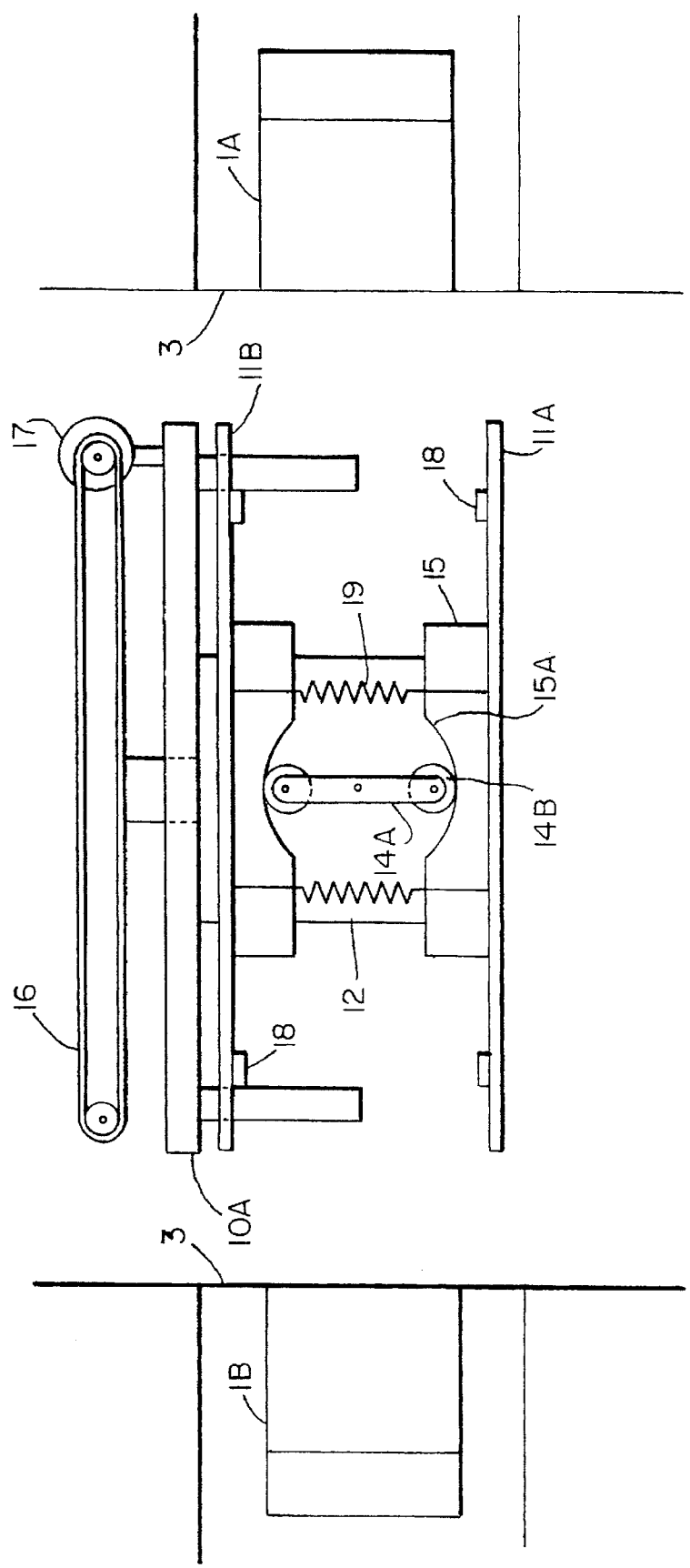
FIGS. 2 and 3 are plan views demonstrating the operation of the embodiment.
Figure 3:
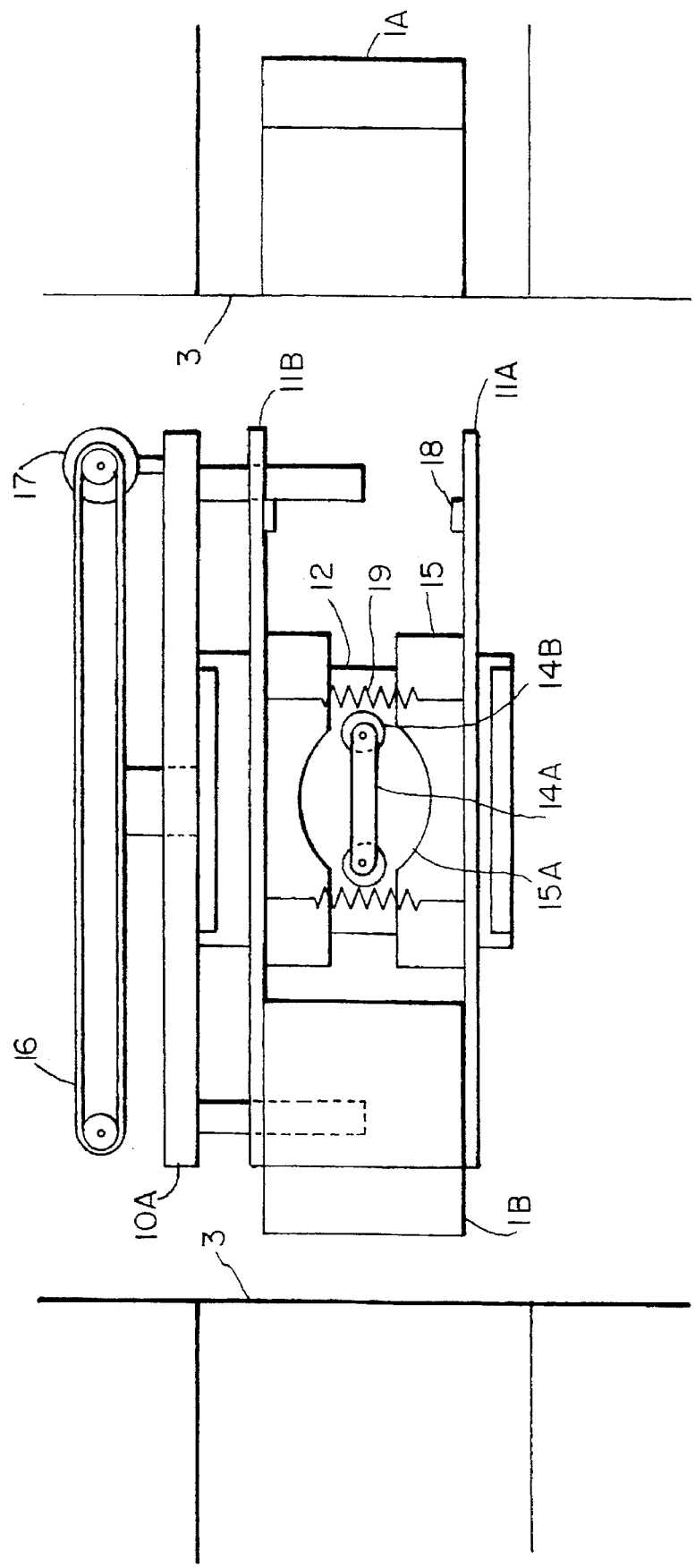
Figure 4:
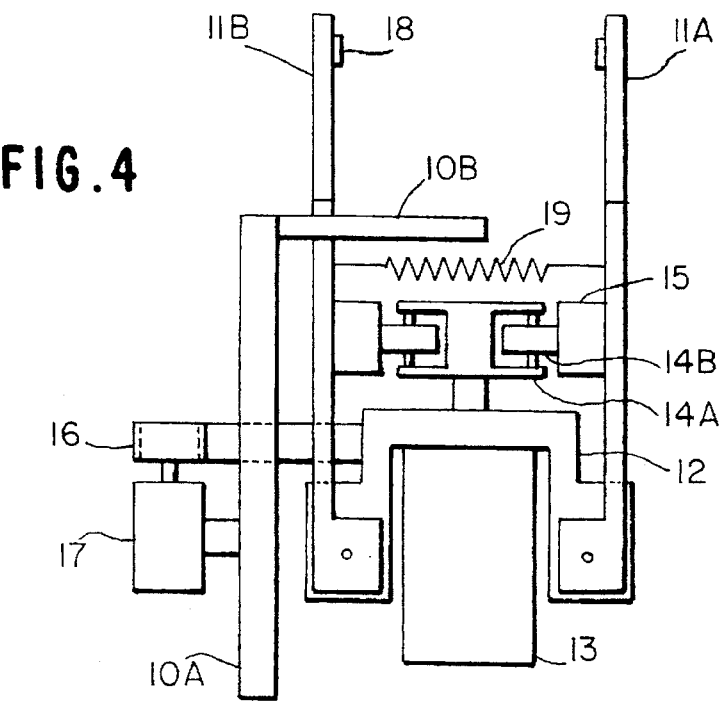
FIGS. 4 and 5 are sections also demonstrating the operation of the embodiment.
Figure 5:
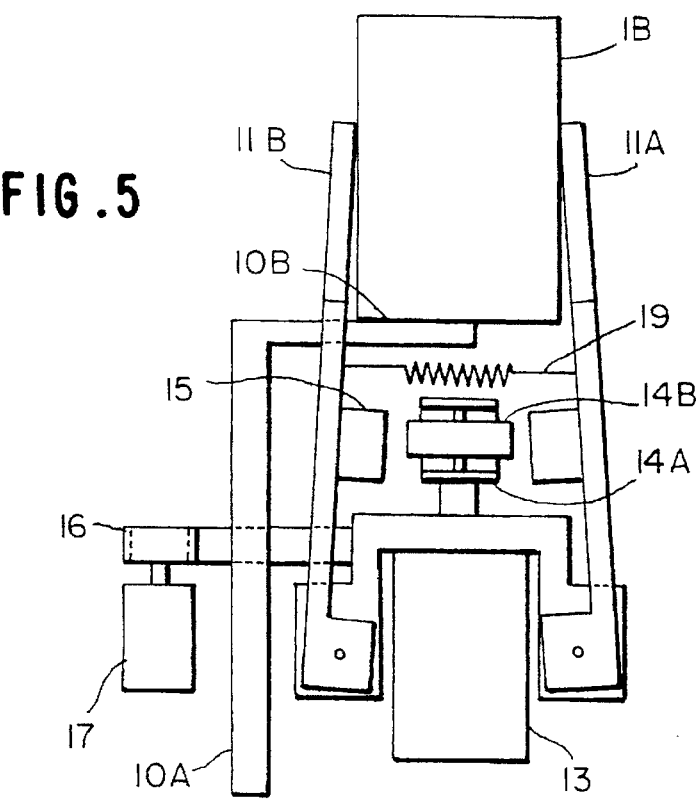

To better understand the present invention, a brief reference will be made to a conventional cartridge carrier mechanism, shown in FIG. 6. As shown, the cartridge carrier mechanism includes a push rod 101, a finger cam holder 103 affixed to the push rod 101, and finger cam rollers 102 rotatably supported by the finger cam holder 103. The push rod 101 is slidably guided by a finger support 104. A pair of fingers 106 are rotatably supported by the finger support 104 at one end thereof and constantly biased toward each other by a finger spring 105 at the intermediate portion thereof. A drive motor 107 moves the finger support 104, as needed. A lock solenoid 108 is mounted on the finger support 104 and prevents the fingers 106 from closing when a magnetic tape cartridge 116 is to be inserted. When the finger support 104 is held in the initial position thereof, the push rod 101 is pushed outward by a finger frame 109 to maintain the two fingers 106 in an open position. The rotation of the drive motor 107 is transmitted to a belt 114 by a pulley 110. The lock solenoid 108 drives a lock lever 112 via a flanger 111 thereof so as to prevent the fingers 106 from closing, as mentioned above. Finger rubbers 113 are fitted on the portions of the inner surfaces of the fingers 106 which face each other and are expected to contact the cartridge 116. A linear guide 115 guides the finger support 104 such that it moves on a linear path.

The finger support 104 is affixed to the belt 114 and moved by the drive motor 107 via the pulley 110. At this instant, the finger support 104 is guided by the linear guide 115 to move on a linear path, as stated above. The lock solenoid 108 is disposed below the finger support 104 and drives the lock lever 112 via the flanger 111 to prevent the fingers 106 from closing when the cartridge 116 is to be inserted. The finger frame 109 includes a projection which pushes the push rod 101 outward along the finger support 104 when the finger support 104 is in the initial position. In this condition, the fingers 106 are maintained in an open position by the finger cam rollers 102.

The operation of the conventional cartridge carrier mechanism will be described with reference also made to FIG. 7. First, the drive motor 107 moves the finger support 104 via the belt 114 to an initial position shown in FIG. 6. At this instant, the linear guide 115 guides the finger support 104 to the initial position. Subsequently, the push rod 101 provided on the finger support 104 abuts against the projection of the finger frame 109. As a result, the push rod 101 is pushed toward the outside of the finger support 104 by the projection in a direction in which the cartridge 116 is to be received. At this instant, the finger cam rollers 102 rotatably supported by the finger cam holder 103 are moved from notched portions included in the fingers 106 until they roll on the inner surfaces of the fingers 106. The rollers 102, therefore, urge the fingers 106 away from each other, or open them, against the action of the finger spring 105.

Thereafter, the finger support 104 is driven toward the cartridge 116 by the motor 107. As a result, the push rod 101 is brought into contact with the cartridge 116, as shown in FIG. 7. In this condition, as the cartridge 116 approaches the finger support 104, it pushes the push rod 101 into the finger support 104. This causes the finger cam rollers 102 to roll on the fingers 106 and return to the notched portions of the fingers 106. Consequently, the fingers 106 are moved toward each other, or closed, by the action of the finger spring 105. Then, the finger rubbers 113 fitted on the inner surfaces of the fingers 106 nip the cartridge 116. In this condition, the cartridge 116 can be pulled out.

Figure 6:
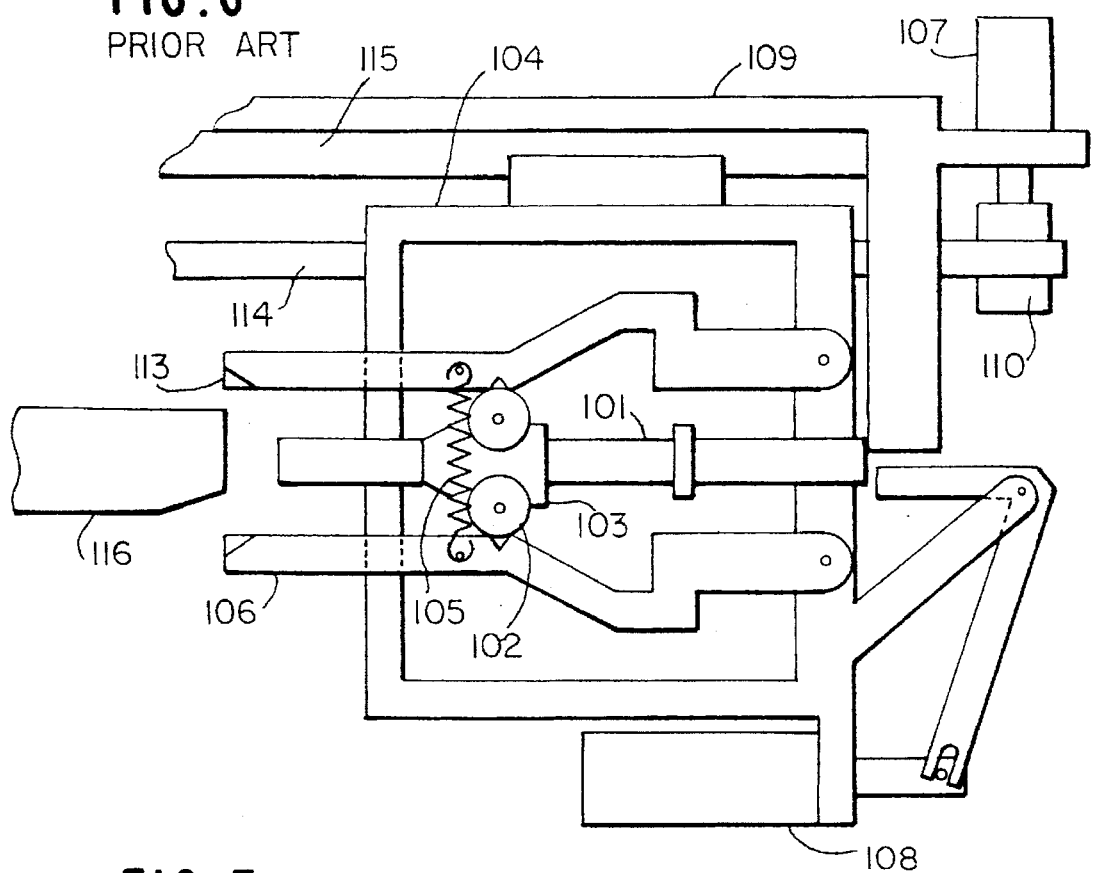
FIG. 6 is a side elevation showing a conventional cartridge carrier mechanism held in an initial position.
Figure 7:
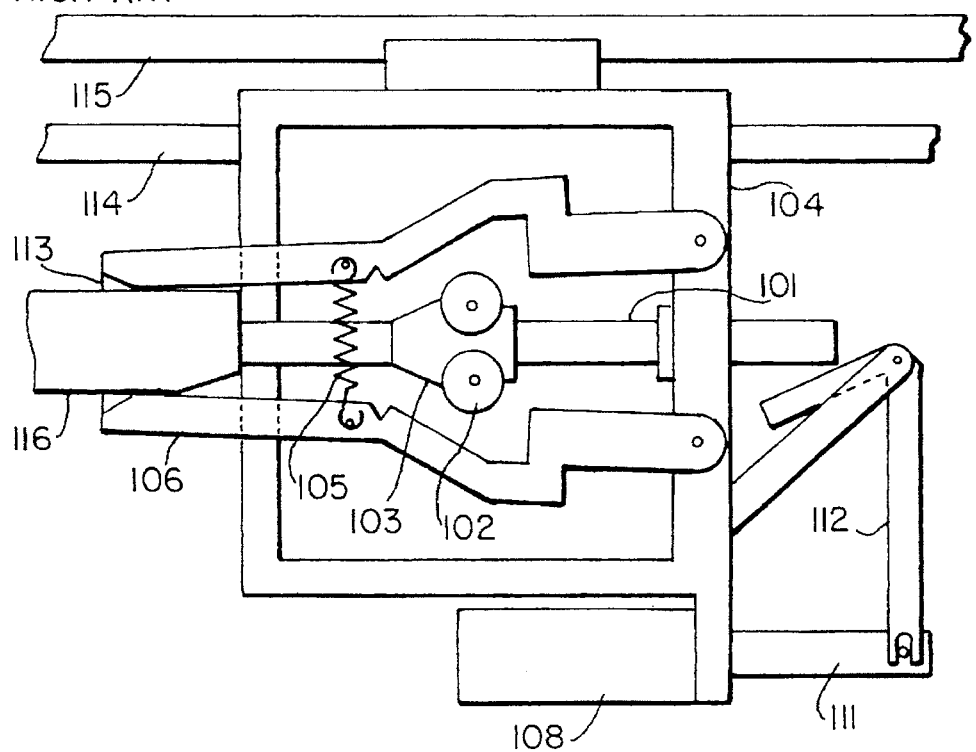
FIG. 7 is a side elevation showing the conventional mechanism in a position for pulling out a magnetic tape cartridge.

To insert the cartridge 116, the lock solenoid 108 moves the lock lever 112 to a locking position shown in FIG. 6. In the locking position, the lock lever 112 restricts the movement of the push rod 101, thereby allowing the cartridge 116 to be inserted.

Referring to FIG. 1, a magnetic tape cartridge apparatus implemented with a cartridge carrier mechanism embodying the present invention is shown. As shown, the apparatus has a pair of honeycomb plates 2A and 2B, and an upper frame 5 and a lower frame 4 which connect the honeycomb plates 2A and 2B to form a casing. A plurality of cell blocks 3 are affixed to the inner periphery of the honeycomb plates 2A and 2B and accommodate a plurality of cartridges 1A and 1B. A top rail 7 and a bottom rail 6 are supported by the upper frame 5 and the lower frame frame 4, respectively. Rollers 9 are rollable on the top rail 7 and bottom rail 6. An accessor 8 is supported by the roller 9 and movable linearly along the bottom rail 6. A hand portion 10 is movable up and down linearly on and along the accessor 8 to transport the cartridge 1A or 1B, as needed.

A reference will also be made to FIGS. 2–5 for describing the operation of the cartridge carrier mechanism embodying the present invention. The hand portion 10 has a hand base 10A movable up and down linearly along the accessor 8. When the cartridge 1A or 1B is held by the cartridge carrier, a projection 10B sustains it to prevent it from dropping from the cartridge carrier. A pair of generally T-shaped fingers 11A and 11B cooperate to hold the cartridge 1A or 1B. The fingers 11A and 11B are rotatably supported by a finger base 12 at one end thereof. The finger base 12 is movable on the hand base 10A in a reciprocating motion in the direction perpendicular to the bottom rail 6 and accessor 8. A finger motor 13 is mounted on the finger base 12 to rotate a finger cam holder 14A which supports finger cam rollers 14B. Finger cams 15 are each affixed to respective one of the intermediate portions of the fingers 11A and 11B and provided with a notched portion 15A. A picker belt 16 is connected to the finger base 12 and movable in a reciprocating motion on the hand base 10A. The picker belt 16 is driven by a picker motor 17. Finger rubbers 18 are fitted on the inner surfaces of the fingers 11A and 11B which face each other. A finger spring 19 is anchored to the intermediate portions of the fingers 11A and 11B at opposite ends thereof so as to constantly bias them toward each other.

In operation, data processing equipment or similar host, not shown, sends information indicative of the position of a particular cell block 3 accommodating a desired cartridge, e.g., 1B to the magnetic tape cartridge apparatus. In response, the apparatus rotates the rollers 9 to move the accessor 8 along the top rail 7 and bottom rail 6 to a position indicated by the received information. Subsequently, the apparatus causes a motor, not shown, to move the hand portion 10 along the accessor 8 to a position also indicated by the information. In this condition, the finger motor 13 is energized to rotate the finger cam roller holder 14A until the finger cam rollers 14B have been brought into contact with the notched portions 15A of the finger cams 15. At this instant, the finger cam rollers 14B roll on the notched portions 15A of the finger cams 15 to push the fingers 11A and 11B away from each other. As a result, the fingers 11A and 11B are opened and ready to receive the desired cartridge 1B (see FIGS. 2 and 4).

Thereafter, the picker motor 17 drives the picker belt 16. Then, the finger base 12 connected to the picker belt 16 is moved on the hand base 10 toward the cell block 3 of interest with the fingers 11A and 11B held in the open position. After the fingers 11A and 11B have been inserted into the cell block 3, the finger motor 13 is energized to rotate the finger cam roller holder 14A. Then, the finger cam rollers 14A supported by the holder 14B roll on the notched portions 15A of the finger cams 15 away from the notched portions 15A. Consequently, the fingers 11A and 11B are moved toward each other, or closed, by the action of the finger spring 19. At this instant, the finger rubbers 18 fitted on the fingers 11A and 11b contact the cartridge 1B to protect it from the impact ascribable to the fingers 11A and 11B. At the same time, the projection 10B of the hand base 10A sustains the cartridge 1B to prevent it from dropping from the fingers 11A and 11B (see FIGS. 3 and 5).

The cartridge 1B pulled out of the cell block 3 by the above procedure is transported to a predetermined position where a head, not shown, is located. Then, the head writes or reads data in or out of the cartridge 1B. After the write-in or read-out of data, the cartridge carrier mechanism again performs the above procedure, but in the reverse order, to convey and return the cartridge 1B to the cell block 3.

In summary, a cartridge carrier mechanism in accordance with the present invention has two generally T-shaped fingers and can, without being bodily turned over, pull out or insert a cartridge into any one of a plurality of cell blocks 3 which are arranged in the casing of a magnetic tape cartridge apparatus. Hence, the overall construction of the cartridge carrier mechanism is simplified. At the same time, the distance between the cell blocks facing each other and, therefore, the overall size of the magnetic tape cartridge apparatus is reduced.

Further, a finger cam is provided on the intermediate portion of each finger for moving the two fingers toward and away from each other. Since the finger cams are each provided with an arcuate notched portion, the distance between the fingers in an open position is maintained constant although a finger cam roller holder and finger cam rollers driven by a finger motor may fail to stop at a predetermined position accurately.

While the present invention has been described in conjunction with the preferred embodiment thereof, it will now be readily possible for those skilled in the art to put the present invention into practice in various other manners.

What is claimed is:

1. A cartridge apparatus comprising:
   a plurality of cell blocks arranged face-to-face, each adapted to accommodate a magnetic tape cartridge therein; and
   a cartridge carrier mechanism movable between said plurality of cell blocks while holding said magnetic tape cartridge;
   said cartridge carrier mechanism comprising:
   a finger base which is movable in a reciprocating motion between corresponding ones of said plurality of cell blocks arranged face-to-face;

two fingers each having a general T-shape, each of said fingers having a stem member and a cross member, the stem member being rotatably supported by said finger base at a position away from the cross member, and the cross members being positioned substantially parallel to each other and facing each other, each of said cross members of said fingers having a gripping means located at each end of the cross member;

two finger cams, each of said two finger cams being fixed to an intermediate portion of the stem member of a respective one of said two fingers;

a pair of finger springs, opposite ends of each of the finger springs being attached to respective intermediate portions of said finger cams, for constantly biasing the cross members of said two fingers toward each other;

a rotatable finger cam holder having two ends and having a finger cam roller at each of said ends, said rotatable finger holder being rotatably mounted between the intermediate portions of said finger cams;

a finger motor mounted on said finger base and mechanically coupled to said finger cam holder for causing said finger cam holder to rotate, whereby, upon rotation of the finger holder, when said rotatable finger cam holder is in one rotation position, each of the finger cam rollers contacts a respective one of said intermediate portions of said two finger cams, thereby causing the cross members of said fingers to be spaced far apart from each other, and when said rotatable finger cam holder is in a second rotation position, each of the finger cam rollers does not contact the respective one of said intermediate portions of said finger cams, thereby allowing the cross members of said fingers to be spaced close to each other due to the biasing of said finger springs, so that corresponding ones of the gripping means of said fingers cooperate to grip said magnetic tape cartridge when said rotatable finger cam holder is in said second rotation position; and a hand base which supports said finger base in a manner in which said finger base is free to move in said reciprocating motion.

2. An apparatus as claimed in claim 1, wherein said two finger cams are each provided with a portion having a curved surface, said portion being positioned to contact a respective one of said finger cam rollers when said finger cam holder rotates.

3. An apparatus as claimed in claim 1, wherein said hand base comprises a projection which supports said magnetic tape cartridge.

4. An apparatus as claimed in claim 1, further comprising:

a picker belt connected to said finger base; and a picker motor mechanically coupled to said picker belt for moving said picker belt and said finger base in said reciprocating motion.

* * * * *